Nov. 2, 1926.
F. SCHWEIZER
1,605,786
CHEESE HANDLING TOOL
Filed March 19, 1926
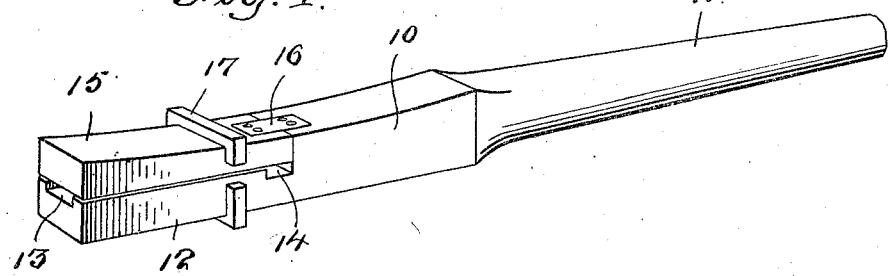
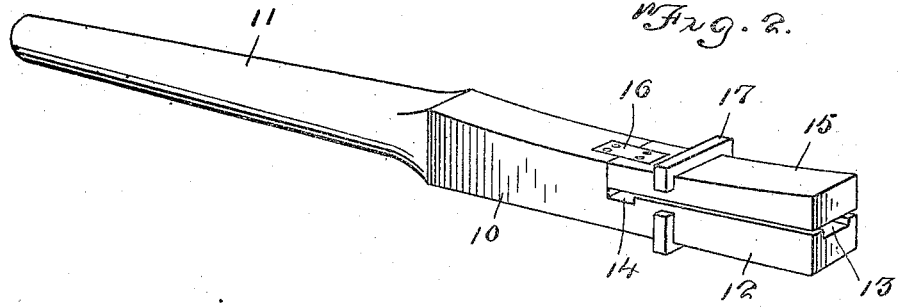
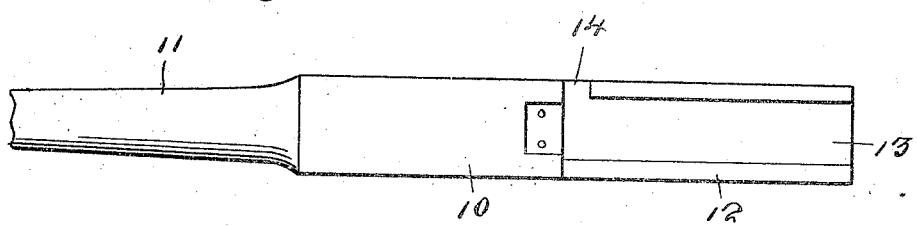
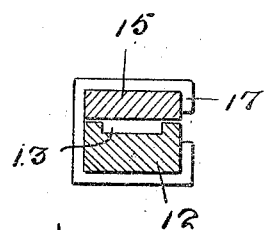
F. Schweizer
INVENTOR
BY Victor J. Evans
ATTORNEY
WITNESS:

Patented Nov. 2, 1926.

1,605,786

UNITED STATES PATENT OFFICE.

FRED SCHWEIZER, OF HOLLANDALE, WISCONSIN.

CHEESE-HANDLING TOOL.

Application filed March 19, 1926. Serial No. 96,007.

This invention relates to protective tools designed for use by the manufacturers of Swiss cheese and has for its object the provision of a novel handle device within which may be engaged the cheesecloth so that the cheese may be lifted out of the hot whey by the cheesemaker without any great degree of inconvenience and without danger to him.

An important object is the provision of a handle device formed as a clamp of peculiar construction and provided with novel means for effecting the clamping action upon the cheesecloth within which the Swiss cheese is wrapped.

An additional object is to provide a device of this character which will be simple and inexpensive in manufacture, easy to use, positive in action, and efficient and durable in service and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a perspective view of the device.

Figure 2 is a similar view taken from the other side.

Figure 3 is a detail view of the main member, and

Figure 4 is a detail cross section.

Referring more particularly to the drawings, I have shown the device as comprising an elongated body member 10 of a bar-like formation formed with an extension 11 which is preferably rounded and tapered so as to constitute an effective handle. Near its other end, the body member 10 is reduced in width to substantially one-half to form a jaw 12, this jaw being formed with a longitudinal groove 13 intersecting a transverse groove 14 which extends to one side. Fitting within the cutaway portion at the forward end of the body 10 and complementary thereto is a jaw member 15 which has its outer surface curved as shown and its inner surface plane for coaction with the cutaway surface 12 of the main member. This jaw member 15 is connected with the body by means of a hinge or resilient plate or strip 16 so that the jaw member 15 may move relatively to the jaw member 12.

Embracingly engaged upon the assembled jaw members is an open loop or frame member 17 which is adapted to be moved longitudinally upon the assembled device for the purpose of forcing the jaw member 15 into clamping relation to the jaw 12.

In the use of the device, the cheesecloth surrounding the Swiss cheese to be lifted from the hot whey is inserted between the jaw members 12 and 15, the transverse recess or slot 14 accommodating the ends of the cheesecloth, it being well known that the ends commonly roll up and require more space than any other portion for their accommodation. The frame member 17 is then slid along in order to bring it into engagement with the curved outer surface 15 of the movable jaw to force it into clamping relation to the cheesecloth and the jaw member 12, it being quite clear that the cheesecloth will then be firmly held and in such manner that the operator may lift the cheese out of the hot whey without any danger of burning himself and without any injury to the cheese itself.

From the foregoing description and a study of the drawings, it will be readily apparent that I have thus provided a very simply constructed device for the purpose specified, and one which will be highly efficient and advantageous in reducing likelihood of injury to the workers or makers of Swiss cheese. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In a tool of the character described, an elongated body member terminating at one end in a handle and at its other end in a jaw, a relatively movable jaw mounted for movement upon the first named jaw and having a curved outer surface, and a clamping member slidably mounted upon both jaws and in embracing relation thereto for forcing the movable jaw towards the relatively fixed jaw.

2. In a tool of the character described, an elongated body member having one end formed with a handle and having its other end partially cutaway to define a jaw, the face of the jaw being formed with a longitudinal slot and a transverse slot communicating therewith, a relatively movable jaw mounted within and filling said cutaway portion, and hingedly connected with the body, and a frame member slidably mounted upon both jaw members for forcing them toward each other, said movable jaw having a curved outer surface exerting a camming action.

3. A device of the character described comprising a handle member terminating at one end in a relatively stationary jaw having its active face formed with a longitudinal groove and a transverse groove communicating therewith and extending to one side, a relatively movable jaw, and means for holding both jaws in clamping relation.

4. A device of the character described comprising a handle member terminating at one end in a relatively stationary jaw having its active face formed with a longitudinal groove and a transverse groove communicating therewith and extending to one side, a relatively movable jaw, and means for holding both jaws in clamping relation, comprising a frame-like member slidably engaged upon the jaws in embracing relation thereto.

In testimony whereof I affix my signature.

FRED SCHWEIZER.